United States Patent Office 3,790,586
Patented Feb. 5, 1974

---

3,790,586
IMIDAZO-PYRIDINE DERIVATIVES
Tsutomu Irikura, Kazunori Kasuga, and Taeko Hashizume, Tokyo, Mitsuo Ohashi, Ageo, Masuo Yuge, Urawa, and Michiko Yamada, Tokyo, Japan, assignors to Kyorin Seiyaku Kabushiki Kaisha, Tokyo, Japan
No Drawing. Filed Feb. 29, 1972, Ser. No. 230,506
Claims priority, application Japan, Mar. 15, 1971, 46/14,159
Int. Cl. C07d 31/42
U.S. Cl. 260—296 H                    12 Claims

ABSTRACT OF THE DISCLOSURE

The present invention provides 3-amino-imidazo[1,5-a]-pyridines expressed by the general formula,

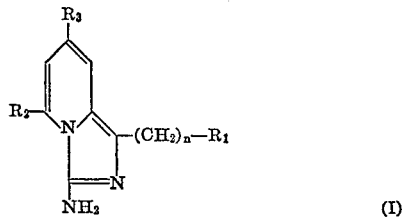

(wherein: $R_1$ is a hydrogen atom, a phenyl group, a halogen-substituted phenyl group, or a lower straight or branched alkyl-substituted phenyl group; $R_2$ is a hydrogen atom, a halogen atom, or a lower straight or branched alkyl group; $R_3$ is a hydrogen atom, a halogen atom, a lower straight or branched alkyl group, an amino group, or an acetoamido group; and $n$ is 0 or 1), and acid addition salts thereof.

The substances of this invention expressed by the general Formula I exhibit excellent gastric antisecretory action without an anticholinergic effect.

---

This invention relates to novel imidazo-pyridine derivatives and the processes for their preparation. In particular, it concerns novel imidazo[1,5-a]pyridines which may be useful in human medicine having excellent gastric antisecretory action without an anticholinergic effect.

In one aspect, therefore, this invention provides 3-amino-imidazo[1,5-a]pyridines of the general formula,

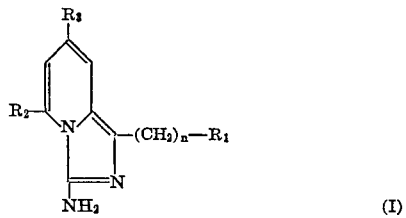

(wherein: $R_1$ is a hydrogen atom, a phenyl group, a halogen-substituted phenyl group, or a lower straight or branched alkyl-substituted phenyl group; $R_2$ is a hydrogen atom, a halogen atom, or a lower straight or branched alkyl group; $R_3$ is a hydrogen atom, a halogen atom, a lower straight or branched alkyl group, an amino group, or an acetoamido group; and $n$ is 0 or 1), and acid addition salts thereof.

The 3-amino-imidazo[1,5-a]pyridines of general Formula I may be prepared according to the following process scheme:

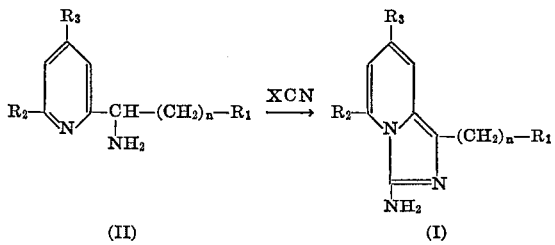

(wherein: $R_1$, $R_2$, $R_3$ and $n$ are as defined hereinbefore; and X is a halogen atom).

The new compounds of this invention expressed by the general Formula I may be prepared by the condensation reaction of the N-(2-pyridylalkyl)amine of the Formula II and cyanogen halide, such as cyanogen bromide, in nonpolar solvent, such as benzene and $CHCl_3$, at 0–100° C.

The 3-amino-imidazo[1,5-a]pyridines of general Formula I may be used in free bases or in non-toxic addition salts thereof, such as the hydrochloride, hydrobromide, sulfate, tartarate and ascorbate, as a medicine.

Till now, medical treatments to protect gastro-intestinal mucosa by inhibiting the gastric acid and pepsin secretion have been generally used. For this purpose, anticholinergic drugs such as certain kinds of salts of atropine and scopolamine, etc., have been used. Most of those drugs, however, are not free from various side effects, such as mouth dryness, inhibition of gastrointestinal tone and motility, and mydriasis.

We have considered that gastric antisecretory compounds with antigastrin action will be more promising for medical use than many of the anticholinergic drugs. On this basis various screening tests were performed using many compounds prepared by the present inventors and the 3-amino-imidazo[1,5-a]pyridine derivatives synthesized in accordance with the present invention were discovered.

Among these compounds, the antigastrin activity of Examples 3 and 10, which are typical of the compounds of the present invention, are so potent and specific that we can find no other drugs possessing such potent and specific antigastrin activity as these compounds. Some of the pharmacological effects of the compounds of Examples 3 and 10, are as follows. One of the effects, namely antigastrin activity, of these compounds in rats was measured by the continuous gastric perfusion technique that is to say Schild's rat by Ghosh and Schild (Ghosh, M. N. and Schild, H. O.; Brit. J. Pharmacol., 13, 54–61, 1958). Continuous gastric hypersecretory response (pH 6.5→3.0 in perfusion fluid) was induced by continuous intravenous infusion of tetragastrin at the rate of 5μg./kg./hr. with an infusion pump. After the compound of Example 3 was injected (1 mg./kg., intravenously), this response was inhibited by about 100%, and after the compound of Example 10 was injected (0.1 mg./kg., intravenously), this response was inhibited by about 80%.

We also performed the evaluation in rats with the chronic fistula technique (Lane, A., Ivy, A. C. and Lay, E. K.; Am. J. Physiol., 192, 221–228, 1957). In this experiment, the inhibitory effects of the compounds of Examples 3 (10 mg./kg., subcutaneously) and 10 (mg./kg. and 5 mg./kg., subcutaneously) on gastric secretory stimulation induced by the subcutaneous injection of 20 μg./kg. of tetragastrin were about 100%, 70% and 100%, respectively.

The inhibitory effects of the compounds of Examples 3 and 10 against gastric basal secretion in pylorous ligated rats, Shay rats so called, described by Shay et al. (Shay, H., et al.; Gastroenterology, 5, 43, 1945; ibid. 26, 900, 1950) and the acute toxicity of the compounds of several examples in mice are shown in the following table.

TABLE.—GASTRIC ANTISECRETORY EFFECTS IN PYLOROUS LIGATED RATS AND ACUTE TOXICITY IN MICE OF THE COMPOUNDS OF THIS INVENTION

| Example | Subcutaneous dose (mg./kg.) | Percent inhibition [1] | | | $LD_{50}$ (mg./kg.) |
|---|---|---|---|---|---|
| | | Volume | Free HCl | Total acid | |
| 1 | 10 | 50 | 62 | 53 | (2) |
| 2 | 10 | 62 | 78 | 65 | 96.0 |
| 3 | 10 | 70 | 95 | 83 | 84.0 |
| 4 | 10 | −31 | −60 | −44 | (2) |
| 5 | 10 | 35 | 27 | 32 | 91.0 |
| 6 | 10 | 4 | −7 | −2 | (2) |
| 7 | 10 | 50 | 65 | 57 | (2) |
| 8 | 10 | 9 | 4 | 0 | (2) |
| 9 | 10 | 50 | 74 | 57 | 67.7 |
| 10 | 10 | 56 | 74 | 56 | 62.0 |
| 11 | 10 | 57 | 73 | 60 | 51.0 |
| 12 | 10 | 35 | 51 | 37 | (2) |
| 13 | 10 | 52 | 73 | 53 | 93.2 |
| 14 | 10 | 54 | 65 | 55 | (2) |
| 15 | 10 | 52 | 56 | 53 | (2) |
| 16 | 10 | 27 | 35 | 26 | (2) |
| 17 | 10 | 42 | 55 | 42 | (2) |
| Xylamide | 500 | 81 | 89 | 80 | |
| SC-15396 | 10 | 9 | 1 | 7 | |

[1] Values of percent inhibition were calculated with the units of ml./100 g./4 hrs. (volume), μeq./100 g./4 hrs. (free HCl) and μeg./100 g./4 hrs. (total acid).
[2] Could not carry out since these examples are only slightly soluble in water.

NOTES:
Xylamide: DL-4-benzamido-N,N-di-n-propylglutaramic acid (Rovati, A. L., et al., Minerva Medica 58 3651 (1967)).
SC-15396: 2-phenyl-2-(2-pyridyl)-thioacetamide (G. Gillespie, et al., Gastroenterology 55(1) 81 (1968)).

Xylamide and SC-15396 are well known as compounds possessing antigastrin activity. The gastric antisecretory potencies of the compounds of Examples 3 and 10 appear to be about 50 times as potent as Xylamide in pylorous ligated rats, about 500 times as potent in chronic fistula rats stimulated by tetragastrin and about 2000 times as potent in Schild's rats stimulated by tetragastrin.

According to these results, we have concluded that 3-amino-imidazo[1,5-a]pyridine derivatives in this invention are promising compounds for medical use, for these compounds possess very potent gastric antisecretory and antigastrin effects and possess no side effects as shown by many anticholinergic drugs.

The following examples are now given, though only by way of the illustration, to show details of preferred reagent, techniques and conditions used in the preparation of the compounds of the invention.

EXAMPLE 1

1-phenyl-3-amino-imidazo[1,5-a]pyridine

Cyanogen bromide (5.7 g.) was added to a mixture of 2-pyridylphenylmethylamine (10 g.), potassium carbonate (1.9 g.) and benzene (150 ml.) at room temperature with stiring. Stirring was continued for additional 2 hours, then the solvent was evaporated, the residue was alkalyzed with an aqueous solution of potassium hydroxide and extracted with benzene. The benzene extracts were evaporated to leave a semisolid and the semisolid was chromatographed over alumina oxide. Recrystallization from benzene-hexane yielded 64.2 of yellow green needles, melting point 153–155.5° C.

Analysis for $C_{13}H_{11}N_3$: Calc'd (percent): C, 74.62; H, 5.30; N, 20.08. Found (percent): C, 74.49; H, 5.21; N, 20.31.

EXAMPLE 2

1-phenyl-3-amino-imidazo[1,5-a]pyridine hydrobromide

Cyanogen bromide (0.6 g.) was added to a solution of 2-pyridylphenylmethylamine (1.0 g.) in benzene (10 ml.) at room temperature with stirring and then the resulting precipitate was filtered. Recrystallization from ethanol-ether yielded 79.7% of yellow green needles, melting point 215.5–216.5° C. (dec.).

Analysis for $C_{13}H_{11}N_3 \cdot HBr \cdot H_2O$: Calc'd (percent): C, 50.66; H, 4.58; N, 13.64. Found (percent): C, 50.25; H, 4.49; N, 13.60.

EXAMPLE 3

1-phenyl-3-amino-imidazo[1,5-a]pyridine hydrochloride 1.0 g. of 1-phenyl-3-amino-imidazo[1,5-a]pyridine prepared by following the same process as in Example 1 was treated with saturated hydrogen cholride-ethanol. Recrystallization from ethanol yielded 93.7% of yellow needles, melting point 196–198° C. (dec.).

Analysis for $C_{13}H_{11}N_3 \cdot HCl$: Calc'd (percent): C, 63.54; H, 4.92; N, 17.10. Found (percent): C, 63.45; H, 4.87; N, 17.18.

EXAMPLE 4

1-phenyl-3-amino-5-methyl-imidazo[1,5-a]pyridine hydrobromide

The compound was obtained by following the same process as in Example 2 from a mixture of 2-(6-methylpyridyl)phenylmethylamine (B.P. 133–135° C./2 mm. Hg, 1.0 g.), cyanogen bromide (0.5 g.) and benzene (10 ml.). Recrystallization from ethanol yielded 78.5% of yellow needles, melting point 230–233° C. (dec.).

Analysis for $C_{14}H_{13}N_3 \cdot HBr$: Calc'd (percent): C, 55.27; H, 4.64; N, 13.81. Found (percent): C, 55.01; H, 4.32; N, 14.10.

EXAMPLE 5

1-phenyl-3-amino-7-methyl-imidazo[1,5-a]pyridine hydrobromide

The compound was obtained by following the same process as in Example 2 from a mixture of 2-(4-methylpyridyl)-phenylmethylamine (B.P. 134–140° C./5 mm. Hg, 1.0 g.), cyanogen bromide (0.5 g.) and benzene (10 ml.). Recrystallization from ethanol-ether yielded 65.3% of yellow green needles, melting point 238° C. (dec.).

Analysis for $C_{14}H_{13}N_3 \cdot HBr$: Calc'd (percent): C, 55.27; H, 4.64; N, 13.81. Found (percent): C, 55.63; H, 4.53; N, 13.53.

EXAMPLE 6

1-benzyl-3-amino-imidazo[1,5-a]pyridine hydrobromide

Cyanogen bromide (2.7 g.) was added to a mixture of α-(2-pyridyl)-β-phenylethylamine (B.P. 130–139° C./ 3 mm. Hg., 5.0 g.) and benzene (75 ml.) at room temperature with stirring. Stirring was continued for additional 1 hour at 50–60° C., then the resulting oil was washed with ether. Recrystallization from ethanol yielded 58.7% of yellow leaflets, melting point 97–98° C.

Analysis for $C_{14}H_{13}N_3 \cdot HBr \cdot H_2O$: Calc'd (percent): C, 52.18; H, 4.38; N, 13.04. Found (percent): C, 51.51; H, 4.76; N, 12.85.

EXAMPLE 7

1-(p-chlorophenyl)-3-amino-imidazo[1,5-a]pyridine hydrochloride

The compound was obtained by following the same process as in Example 2 from a mixture of 2-pyridyl-(p-chlorophenyl)-methylamine (B.P. 142–151° C./2 mm. Hg, 3.1 g.), cyanogen bromide (1.5 g.) and benzene (30 ml.). Recrystallization from ethanol yielded 84.0% of yellow green needles, melting point 232° C. (dec.).

Analysis for $C_{13}H_{11}N_3Cl \cdot H_2O$: Calc'd (percent): C, 45.57; H, 3.82; N, 12.26. Found (percent): C, 45.82; H, 3.43; N, 12.04.

EXAMPLE 8

1-(p-methylphenyl)-3-amino-7-methyl-imidazo[1,5-a]-pyridine hydrobromide

The compound was obtained by following the same process as in Example 2 from a mixture of 2-(4-methylpyridyl)-(p-methylphenyl)methylamine (B.P. 141–146° C./2 mm. Hg, 5.0 g.), cyanogen bromide (2.5 g.) and benzene (50 ml.). The crude crystals were washed with ether and methanol. Recrystallization from methanol-ether yielded 62.0% of yellow green needles, melting point 239–241° C. (dec.).

Analysis for $C_{15}H_{15}N_3 \cdot HBr$: Calc'd (percent): C, 56.61; H, 5.07; N, 13.20. Found (percent): C, 55.98; H, 5.05; N, 13.11.

EXAMPLE 9

1-(m-methylphenyl)-3-amino-imidazo[1,5-a]pyridine hydrobromide

The compound was obtained by following the same process as in Example 2 from a mixture of 2-pyridyl-(m-methylphenyl)-methylamine (B.P. 145–146° C./3 mm., Hg, 5.5 g.), cyanogen bromide (3.0 g.) and benzene (50 ml.). Recrystallization from ethanol yielded 82.5% of yellow green needles, melting point 207° C. (dec.).

Analysis for $C_{14}H_{13}N_3 \cdot HBr$: Calc'd (percent): C, 55.28; H, 4.64; N, 13.81. Found (percent): C, 55.24; H, 4.87; N, 13.80.

EXAMPLE 10

1-(o-methylphenyl)-3-amino-imidazo[1,5-a]pyridine hydrobromide

The compound was obtained by following the same process as in Example 2 from a mixture of 2-pyridyl-(o-methylphenyl)-methylamine (B.P. 139–140° C./3 mm. Hg, 4.0 g.), cyanogen bromide (2.2 g.) and benzene (40 ml.). Recrystallization from ethanol yielded 44.5% of green needles, melting point 201° C. (dec.).

Analysis for $C_{14}H_{13}N_3 \cdot HBr \cdot H_2O$: Calc'd (percent): C, 52.18; H, 5.01; N, 13.04. Found (percent): C, 51.73; H, 4.83; N, 13.05.

EXAMPLE 11

1-(o-methylphenyl)-3-amino-imidazo[1,5-a]pyridine hydrochloride

1 - (o-methylphenyl-3-amino[1,5-a]pyridine hydrobromide (35 g.) prepared by following the same process as in Example 10, was neutralized with 20% sodium hydroxide aqueous solution. The free base was treated with saturated hydrogen chloride-ethanol to give the title compound. Recrystallization from ethanol-ether yielded 81.9% of yellow green needles, melting point 180° C. (dec.).

Analysis for $C_{14}H_{13}N_3 \cdot HCl \cdot H_2O$: Calc'd (percent): C, 60.54; H, 5.81; N, 15.13. Found (percent): C, 60.39; H, 5.59; N, 15.40.

EXAMPLE 12

1-(o-methylphenyl)-3-amino-imidazo[1,5-a]pyridine maleate

The free base (3.5 g.) prepared by following the same process as in Example 11, was treated with maleic acid (3.0 g.) in ethanol (50 ml.) to give the title compound. Recrystallization from ethanol yielded 63.2% of orange leaflets, melting point 171–173° C. (dec.).

Analysis for $C_{14}H_{13}N_3 \cdot C_4H_4O_4$: Calc'd (percent): C, 63.71; H, 5.05; N, 12.38. Found (percent): C, 63.71; H, 5.31; N, 11.97.

EXAMPLE 13

1-(o-chlorophenyl)-3-amino-imidazo[1,5-a]pyridine hydrobromide

The compound was obtained by following the same process as in Example 2 from a mixture of 2-pyridyl-(o-chlorophenyl)-methylamine (B.P. 134–135° C./2 mm. Hg, 3.5 g.), cyanogen bromide (1.8 g.) and benzene (30 ml.). Recrystallization from methanol-ether yielded 69.4% of green needles, melting point 201° C. (dec.).

Analysis for $C_{13}H_{10}N_3Cl \cdot HBr$: Calc'd (percent): C, 48.10; H, 3.42; N, 12.95. Found (percent): C, 48.23; H, 3.57; N, 12.86.

EXAMPLE 14

1-phenyl-3-amino-7-isopropyl-imidazo[1,5-a]pyridine hydrobromide

The compound was obtained by following the same process as in Example 2 from a mixture of 2-(4-isopropylpyridyl)-phenylmethylamine (B.P. 139–143° C./3 mm. Hg, 4.5 g.), cyanogen bromide (2.1 g.) and benzene (40 ml.). Recrystallization from methanol-ether yielded 75.8% of yellow green leaflets, melting point 207° C. (dec.).

Analysis for $C_{16}H_{17}N_3 \cdot HBr$: Calc'd (percent): C, 57.84; H, 5.46; N, 12.65. Found (percent): C, 57.53; H, 5.26; N, 12.83.

EXAMPLE 15

1-(m-chlorophenyl)-3-amino-imidazo[1,5-a]pyridine hydrobromide

The compound was obtained by following the same processes as in Example 2 from a mixture of 2-pyridyl-(m-chlorophenyl)-methylamine (B.P. 153–155° C./2 mm. Hg, 6.5 g.), cyanogen bromide (3.2 g.) and benzene (60 ml.). Recrystallization from methanol yielded 86.7% of yellow green needles, melting point 198° C. (dec.).

Analysis for $C_{13}H_{10}N_3Cl \cdot HBr \cdot H_2O$: Calc'd (percent): C, 45.57; H, 3.82; N, 12.26. Found (percent): C, 45.92; H, 3.89; N, 12.63.

EXAMPLE 16

1-phenyl-3-amino-imidazo[1,5-a]pyridine sulfate

The free base (1.0 g.) prepared by following the same process as in Example 1, was treated with sulfuric acid-ethanol to give the title compound. Recrystallization from methanol-ether yielded 31.0% of yellow needles, melting point 227–228° C. (dec.).

Analysis for $C_{13}H_{11}N_3 \cdot \frac{1}{2} H_2SO_4$: Calc'd (percent): C, 60.46; H, 4.68; N, 16.27. Found (percent): C, 60.15; H, 4.83; N, 15.67.

EXAMPLE 17

1-phenyl-3-amino-imidazo[1,5-a]pyridine tartrate

The free base (1.0 g.) prepared by following the same process as in Example 1, was treated with tartaric acid-ethanol to give the title compound. Recrystallization from dimethylformamide-water yielded 21.4% of black brown needles, melting point 218–219° C. (dec.).

Analysis for $C_{13}H_{11}N_3 \cdot \frac{1}{2} C_4H_6O_6$: Calc'd (percent): C, 63.37; H, 4.96; N, 14.78. Found (percent): C, 63.06; H, 4.98; N, 15.21.

What is claimed is:

1. 3-amino-imidazo[1,5-a]pyridines expressed by the following general Formula I,

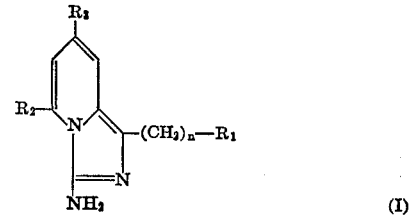

(wherein: $R_1$ is hydrogen, phenyl, halogen-substituted phenyl, or lower straight or branched alkyl-substituted phenyl; $R_2$ is hydrogen, halogen or lower straight or branched alkyl; $R_3$ is hydrogen, halogen, lower straight or branch alkyl, amino or acetamido; and $n$ is 0 or 1), and nontoxic acid addition salts thereof.

2. 1-phenyl-3-amino-imidazo[1,5-a]pyridine.

3. 1-(p-chlorophenyl)-3-amino - imidazo[1,5-a]pyridine.

4. 1-phenyl-3-amino - 7 - methyl-imidazo[1,5-a]pyridine.

5. 1-(p-methylphenyl) - 3 - amino-7-methyl-imidazo[1,5-a]pyridine.

6. 1-phenyl-3-amino-5-methyl-imidazo[1,5-a]pyridine.

7. 1-(m-methylphenyl)-3-amino-imidazo[1,5-a]pyridine.

8. 1-(o-methylphenyl)-3-amino-imidazo[1,5-a]pyridine.

9. 1-(o-chlorophenyl)-3-amino-imidazo[1,5-a]pyridine.

10. 1-phenyl-3-amino-7-isopropyl-imidazo[1,5-a]pyridine.

11. 1-(m-chlorophenyl)-3-amino-imidazo[1,5-a]pyridine.

12. 1-benzyl-3-amino-imidazo[1,5-a]pyridine.

References Cited
UNITED STATES PATENTS 3,509,167  4/1970  Miller _____ 260—296 H ALAN L. ROTMAN, Primary Examiner U.S. Cl. X.R.

260—295 S, 295 K; 424—263, 266